(12) United States Patent
Smyrniotis et al.

(10) Patent No.: US 8,992,868 B2
(45) Date of Patent: *Mar. 31, 2015

(54) DRY PROCESSES, APPARATUS COMPOSITIONS AND SYSTEMS FOR REDUCING MERCURY, SULFUR OXIDES AND HCL

(71) Applicant: Fuel Tech, Inc., Warrenville, IL (US)

(72) Inventors: Christopher R. Smyrniotis, St. Charles, IL (US); Kent W. Schulz, Geneva, IL (US); Emelito P. Rivera, Inverness, IL (US); Mingming Fang, Naperville, IL (US); Ian Saratovsky, Highland Park, IL (US)

(73) Assignee: Fuel Tech, Inc., Warrenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,668

(22) Filed: Apr. 30, 2013

(65) Prior Publication Data

US 2013/0294987 A1    Nov. 7, 2013

Related U.S. Application Data

(60) Provisional application No. 61/641,055, filed on May 1, 2012.

(51) Int. Cl.
*B01D 53/64* (2006.01)
*B01D 53/74* (2006.01)
(Continued)

(52) U.S. Cl.
CPC ............... *B01D 53/64* (2013.01); *B01D 53/80* (2013.01); *B01D 2253/11* (2013.01);
(Continued)

(58) Field of Classification Search
CPC ............ B01D 53/80; B01D 2259/126; B01D 2253/11; B01D 53/64; F23J 15/02
USPC ......... 423/210, 240 S, 242.1, 244.01, 244.07, 423/244.06; 422/111, 168, 177; 252/184, 252/189, 182.32; 700/271, 266
See application file for complete search history.

(56) References Cited

U.S. PATENT DOCUMENTS 2,965,438 A    12/1960  Mullen, Jr.
3,226,992 A    12/1965  Atsukawa
(Continued)

OTHER PUBLICATIONS

EPA-4521R-97-010; Dec. 1997; Mercury Study, Report to Congress; vol. VIII: An Evaluation of Mercury Control Technologies and Costs.
(Continued)

*Primary Examiner* — Timothy Vanoy
(74) *Attorney, Agent, or Firm* — Thaddius J. Carvis

(57) ABSTRACT

Dry processes, apparatus, compositions and systems are provided for reducing emissions of mercury and optionally sulfur oxides and/or HCl. In an embodiment the copper-based mercury remediation composition comprises a copper ammonium complex having an empirical formula of $C_2H_7CuNO_2$ or any of the other materials described, which include compositions defined by the formula $Cu(NH_3)_x$(lower carboxylate)$_y$, wherein the lower carboxylate is selected from the group consisting of formate, acetate and propionate, x is an integer from 0 to 4, y is an integer from 0 to 2, and x+y is equal to or greater than 1. Sulfur oxides and/or HCl can be additionally reduced by introduction of dolomite hydrate sorbent, and additional mercury remediation chemicals as manganese oxides can be employed. The treated gas stream is treated with a particulate removal device.

34 Claims, 3 Drawing Sheets

(51) Int. Cl.
  *G05B 21/00* (2006.01)
  *B01D 53/80* (2006.01)
  *F23J 15/00* (2006.01)
  *F23J 15/02* (2006.01)

(52) U.S. Cl.
  CPC ........ *B01D 2259/126* (2013.01); *F23J 15/003* (2013.01); *F23J 15/025* (2013.01); *F23J 2215/20* (2013.01); *F23J 2215/60* (2013.01)
  USPC .................... 423/210; 423/240 S; 423/242.1; 423/244.01; 423/244.07; 423/244.06; 422/111; 422/168; 422/177; 252/184; 252/189; 252/182.32; 700/266; 700/271

(56) References Cited

U.S. PATENT DOCUMENTS

| | | | |
|---|---|---|---|
| 3,956,458 A | | 5/1976 | Anderson |
| 4,020,180 A | | 4/1977 | Woerner |
| 4,500,327 A | | 2/1985 | Nishino |
| 4,731,233 A | | 3/1988 | Thompson |
| 4,755,499 A | | 7/1988 | Neal |
| 4,923,688 A | | 5/1990 | Iannicelli |
| 5,190,908 A | * | 3/1993 | Audeh et al. ................. 502/415 |
| 5,492,685 A | | 2/1996 | Moran |
| 5,520,898 A | | 5/1996 | Pinnavaia |
| 5,658,547 A | | 8/1997 | Michalak |
| 5,740,745 A | | 4/1998 | Smyrniotis |
| 5,897,688 A | | 4/1999 | Voogt |
| 6,281,164 B1 | | 8/2001 | Demmel |
| 6,579,507 B2 | | 6/2003 | Pahlman |
| 6,808,692 B2 | | 10/2004 | Oehr |
| 6,878,358 B2 | | 4/2005 | Vosteen |
| 6,953,494 B2 | | 10/2005 | Nelson |
| 6,974,564 B2 | | 12/2005 | Biermann |
| 7,435,286 B2 | | 10/2008 | Olson |
| 7,704,920 B2 | * | 4/2010 | Yang et al. .................... 502/400 |
| 2004/0109800 A1 | * | 6/2004 | Pahlman et al. ............. 423/210 |
| 2006/0210463 A1 | | 9/2006 | Comrie |
| 2008/0127631 A1 | | 6/2008 | Haitko |
| 2009/0056538 A1 | | 3/2009 | Srinivasachar |
| 2010/0059428 A1 | | 3/2010 | Boren |
| 2010/0282140 A1 | | 11/2010 | Matteson |
| 2010/0317509 A1 | | 12/2010 | Wang |
| 2011/0079143 A1 | | 4/2011 | Marotta |
| 2011/0123422 A1 | * | 5/2011 | Wang ........................ 423/240 S |
| 2012/0103907 A1 | * | 5/2012 | MacKinnon et al. ......... 210/660 |
| 2013/0202503 A1 | * | 8/2013 | Simonetti et al. ............. 423/210 |

OTHER PUBLICATIONS

Kettner, The Removal of Sulfur Dioxide from Flue Gases. Bulletin of the World Health Organization. 32: 421-429, 1965 retreived from the Internet<URL:http://whqlibdoc.who.int/bulletin/1965/Vol32/Vol32-No3/bulletin_1965_32% 283T 29_421-429.pdf>.

Srivastava, Ravi K., Controlling SO2 Emissions: A Review of Technologies; EPA/600/R-00/0093, Nov. 2000.

* cited by examiner

DRY PROCESSES, APPARATUS COMPOSITIONS AND SYSTEMS FOR REDUCING MERCURY, SULFUR OXIDES AND HCL

CROSS REFERENCE TO RELATED APPLICATIONS AND PRIORITY CLAIM

This application is related to copending U.S. patent application Ser. No. 13/854,361, filed Apr. 1, 2013 and claims priority to copending U.S. Provisional Patent Application No. 61/641,055, filed May 1, 2012, the disclosures of both of which are hereby incorporated herein in their entireties.

FIELD OF THE INVENTION

The invention relates to dry processes, apparatus, compositions and systems for reducing emissions of mercury with benefits also for reducing sulfur oxides, sulfur dioxide in particular, and HCl. The invention employs highly-effective mercury remediation compositions alone or in combination with a sorbent and/or other optional flue gas treatment compositions.

BACKGROUND OF THE INVENTION

Mercury is toxic, and its remediation has recently taken on regulatory and technical momentum. It is important for the environment and for compliance with current laws designed to protect it to control mercury as well as sulfur oxides and other acid gases, such as chlorides, which individually and as a group have challenged combustion plant operators and regulators alike.

The problem of mercury has received considerable attention, and with a significant report was prepared for Congress in 1997. See: EPA-452/R-97-010; December 1997; Mercury Study, Report to Congress; Volume VIII: An Evaluation of Mercury Control Technologies and Costs, which was prepared by the U.S. EPA. The report evaluates then available technologies and calls for the need for further testing for data collection and evaluation. Recent activity has improved the ability of the art to achieve effective solutions, but the achievement of a process that remediates mercury emissions effectively and economically has been evasive.

Various sorbents, including carbon-based and mineral-based materials, have been identified; and in some cases doping agents, like sulfur and halides, have enhanced their effectiveness. In some cases oxidizing agents such as halides have been introduced with or in advance of sorbent introduction.

Among the carbon technologies for mercury remediation is U.S. Pat. No. 6,953,494 to Nelson, which relates to a mercury sorbent prepared by treating a carbonaceous substrate with a bromine-containing gas for a time sufficient to increase the ability of the carbonaceous substrate to adsorb mercury and mercury-containing compounds. In another carbon teaching, U.S. Pat. No. 7,435,286, to Olson, et al., provides specific halogenated carbon comprising active sites with halide covalently-bound to a base-activated carbon and providing an optional co-injection of an alkaline sorbent. The activated carbon can be further impregnated with sulfur, known to be useful as a mercury removing material, for example by Anderson in U.S. Pat. No. 3,956,458, who recommends the use of an elemental sulfur filter followed by an iodine-impregnated filter. See also, U.S. Pat. No. 4,500,327, to Nishino, et al., teaches that mercury vapors can be removed from exhausts by activated carbons impregnated with combinations of sulfur, metal sulfates or nitrates, iodine oxides or oxyacids, and the iodides or bromides of K, Na, or $NH_4$.

Among the mineral-based sorbents are those described in U.S. Pat. No. 6,974,564 to Biermann, et al., which describes contacting a mercury-containing gas stream with a sorbent at temperature above 170° C., wherein the sorbent has an active component of a mixture of silica-alumina compounds and/or calcium compounds, e.g., kaolin. Also, with regard to mineral sorbents is U.S. Pat. No. 5,897,688, to Voght, et al., which teaches removing a metal from a stream of hot gas, wherein a particulate material comprising calcium and aluminum-silicate is contacted in the hot gas to absorb metal present in the hot gas. And, U.S. Pat. No. 6,878,358 to Vosteen, et al., feeds a bromine compound to flue gas at a contact temperature of at least 500° C. following combustion carried out in the presence of a sulfur compound to facilitate cleanup of mercury in a wet scrubber and/or a dry cleanup. U.S. Pat. No. 6,808,692 to Oehr, injects a molecular halogen or thermolabile molecular halogen precursor, such as calcium hypochlorite, to convert elemental mercury to mercuric halide, which is adsorbable by alkaline solids such as subbituminous or lignite coal ash, alkali fused bituminous coal ash, and dry flue gas desulphurization solids. U.S. Pat. No. 6,579,507, to Pahlman, et al., describes a system for removing targeted pollutants, including oxides of sulfur, oxides of nitrogen, and mercury compounds, from gases using oxides of manganese, which are introduced to interact with a pollutant as a catalyst, reactant, adsorbent or absorbent in a single-stage, dual-stage, or multi-stage system. Related is U.S. Patent Publication No. 2010/0059428, for a process that enables using metal oxide sorbents, both with foreign metal cations and on substrates with varying degrees of target pollutant loading rates. In another mineral sorbent approach, U.S. Patent Publication No. 2006/0210463 to Comrie describes decreasing emissions of mercury with various sorbent compositions added directly to the fuel before combustion and/or into the flue gas post combustion zone, wherein the sorbent compositions comprise a source of halogen and preferably a source of calcium.

While recent efforts in air pollution control have actively addressed mercury remediation, there is always a concern that specialized treatments for mercury control should not adversely affect other control measures, such as for the reduction of sulfur oxides, hydrogen chloride, nitrogen oxides, and the like. It would be desirable to find a way to achieve mercury remediation that could complement and desirably enhance reduction of other pollutants.

The problem of sulfur oxides has challenged combustion plant operators and regulators since there became an awareness of the harmful effects of acid rain. Sulfur oxides are formed during the combustion of sulfur-containing carbonaceous fuels and are referred to generally as $SO_x$ while comprising sulfur dioxide ($SO_2$) and sulfur trioxide ($SO_3$). The vast majority of $SO_x$ is present as $SO_2$. The $SO_3$ (as $H_2SO_4$) can, however, add to particulates emitted and can cause cold end corrosion. Accordingly, an effective system must address both $SO_2$ and $SO_3$. Ideally, the process should also address the problem of hydrochloric acid (HCl).

The art has provided a wide range of technologies. As a group, they can be called flue gas desulfurization technologies, FGD. See, for example, Srivastava, Ravi K.; *Controlling $SO_2$ Emissions: A Review of Technologies*; EPA/600/R-00/093, November 2000. These include both wet and dry technologies and can employ existing equipment, such as duct work, or provide separate reactors.

According to Srivastava, FGD technologies fall into two main categories: (1) once-through and (2) regenerable. In the former, the sorbent is discarded after use; and in the latter, the sorbent is regenerated after it has sorbed $SO_2$.

In once-through processes, sorbed $SO_2$ is bound by the sorbent and the sorbent is considered spent. The spent sorbents can be disposed of or recovered as a useful by-product, like gypsum, depending on quality and market factors.

Technologies considered regenerable can treat the sorbents to release the $SO_2$ and obtain useful products. After regeneration, the sorbent can be recycled for additional $SO_2$ scrubbing.

Each of the once-through and regenerable technologies can be further broken down as wet or dry. Wet processes produce a wet slurry waste or by-product, and scrubbed flue gas is saturated with water. The dry processes produce dry waste material, and scrubbed flue gas is not saturated.

The reader is referred to Srivastava, supra, for a closer view of the various technologies, where the authors group major FGD technologies into three major categories: (1) Wet FGD (composed of once-through wet FGD), (2) Dry FGD (composed of once-through dry FGD) and (3) Regenerable FGD (composed of wet and dry regenerable FGD)

The wet FGD processes can employ wet scrubbers, which typically employ large towers that cause contact between combustion flue gases and a slurry of calcium carbonate or the like that is sprayed countercurrently to the flue gas flow. Suitable chemical slurries can include calcium carbonate (limestone), lime (CaO in slurry as Ca $(OH)_2$), trona (sodium sesquicarbonate), sodium bicarbonate, dolomite, and the like, or blends of these materials. In limestone-based scrubbers, the $SO_x$ is captured to form $CaSO_3$, which is naturally oxidized in part or overtly oxidized to form gypsum ($CaSO_4$), which can be used commercially. Reaction between the $SO_x$ and the sorbent occurs in the liquid phase in a stirred tank over considerable time periods. Fuels high in chlorides will alter the chemical equilibrium in the liquid and can adversely affect scrubber efficiency. Quality and market conditions will dictate the value and fate of the spent sorbent. These wet scrubbers are expensive to install and operate and cannot be easily adapted to all plants.

The dry processes can introduce these same type of chemicals, either dry or as slurries that rapidly dry, into a flue gas stream in the furnace, a separate reactor or a duct or other passage carrying the flue gas, wherein the $SO_x$ is captured to some extent and can be disposed of in dry particulate form.

In one group of dry processes, a slurry is sprayed into a separate reactor—adapted from industrial spray driers—to cause intimate contact with the flue gases for moderate reaction times, e.g., ten seconds or more. These processes are quite effective, while not as effective as the wet scrubbers. They, however, are also capital intensive but cannot provide the high quality gypsum achievable by wet scrubbers.

In in-furnace sorbent injection, a dry sorbent is injected directly into the furnace in the optimum temperature region above the flame. As a result of the high temperature (e.g., on the order of 2000° F.), sorbent particles (e.g., often calcium hydroxide or calcium carbonate) decompose and become porous solids with high surface systems. Residence time is very short, on the order of a few seconds, and the sorbent particles are easily fouled before the chemical is fully utilized.

In-duct sorbent injection, like in-furnace sorbent injection, involves direct injection of sorbent into $SO_x$-containing gases. In these processes, the sorbent is introduced into a flue gas duct, but in contrast to spray drying, contact is made without the advantage of a large reaction vessel as used in spray dryers, and suffers from greatly diminished contact times, e.g., often only a few seconds. In-duct injection, typically uses an alkali metal or alkaline earth oxide or hydroxide, like trona, sodium carbonate, calcium hydroxide, magnesium hydroxide, dolomite, or the like, as outlined by Srivastava, supra, and U.S. Pat. No. 5,658,547 to Michalak, et al. U.S. Pat. No. 5,492,685 to Moran describes a hydrated lime having high surface area and small particle size prepared by hydrating lime with an aqueous hydration solution of an organic solvent, and preferably washing the resulting hydrate with an aqueous solution of an organic solvent prior to drying. The high surface area hydrates (e.g., up to 85 $m^2/g$) are sorbents for $SO_2$ removal from gas streams.

U.S. Pat. No. 5,658,547 to Michalak, et al., describes removing $SO_x$ and particulates from the combustion gases of a large boiler. In a primary treatment zone, a slurry comprising an alkaline $SO_x$-reducing composition and preferably a nitrogen-containing composition effective to reduce $NO_x$, is introduced into combustion gases at a temperature of from about 900° to about 1300° C. (about 165° to about 2375° F.). The gases are cooled by initial contact with steam-generating means, and then by contact with a gas-to-gas heat exchanger. Cooled gases are then subjected to a secondary treatment in which they are first humidified and further cooled by introduction of a water spray or aerosol to reduce the temperature to 100° C. (212° F.) or below. Contact between the $SO_x$-reducing composition and the humidified gas is maintained for a reaction period of at least two seconds. Particulate solids are then separated from the gases with a fabric filter. The cleaned gases are reheated by the gas-to-gas heat exchanger prior to discharge to the atmosphere.

These processes require feeding large quantities of these $SO_x$-reducing reagents, whether to the furnace or to back end duct work, and add significant solids to ash capture equipment and in some cases can degrade performance and cause operating and handling problems under certain conditions. There remains a need for a dry scrubbing process that can increase the sorbent utilization and removal efficiencies.

Other dry processes can include fluidized beds that provide longer reaction times. These processes are typically engineered to recirulate the sorbent for multiple passes with the combustion gases to enhance economy by increasing utilization of the sorbent. The sorbents for these processes are intended for recycling and are, therefore, more expensive to make and handle.

An example of these latter types of processes is seen in U.S. Pat. No. 4,755,499 to Neal, et al., which describes sorbents that are intended to be resistant to normal physical degradation which results from recurring adsorption and regeneration for use in a fluidized bed absorber. The sorbent is constructed of (a) an alumina substrate having a specified pore volume and (b) an alkali metal or alkaline earth component in defined amount relative to the substrate. Minor amounts of other metallic oxides can also be employed. The sorbents are manufactured to be regenerable and attrition resistant. They can be regenerated by heating in an inert atmosphere at temperatures up to about 350° C. and then reused.

In a related disclosure, U.S. Pat. No. 6,281,164, Demmel, et al., teach that the useful life of $SO_x$ additives having a $SO_2$ to $SO_3$ oxidation catalyst component and a $SO_3$ absorption component can be extended by employing each of these components as separate and distinct physical particles or pellets. The particles are prepared by spray drying or desiccation followed by calcination to produce microspheroidal particles having a range of sizes such that essentially all such particles will be retained by a Standard U.S. 200 mesh screen and essentially all particles will be passed by a Standard U.S. 60 mesh screen. Processing to reduce $SO_x$ entails capturing the $SO_x$ on the particles and then regenerating the particles for reuse. These particles are too expensive for once-through processes and are, in fact, too large to achieve good utilization in those processes.

Another example of regenerable sorbents is found in U.S. Pat. No. 5,114,898 to Pinnavaia, et al., which describes processes for removing noxious sulfur oxides from gas streams, particularly from flue gases of coal-burning power plants, using heated layered double hydroxide (LDH) sorbents. The sorbent compositions contain metal components, incorporated into the sorbents either by isomorphous replacement of all or part of $M^{11}$ and/or $M^{111}$ ions (the patent defining $M^{11}$ as a divalent metal and $M^{111}$ as a trivalent metal) in layers of LDH structures or by impregnation as a metal salt, to promote the oxidation of sulfur dioxide.

In another related teaching, U.S. Pat. No. 5,520,898 to Pinnavaia, et al., describes the use of base/clay composite materials as sorbents for the removal of $SO_x$ from flue gas streams. The composite contains a smectite clay and a sorbent component, such as alkaline earth metal hydroxides and carbonates, and a metal oxide or metal oxide precursor, preferably selected from transition metal ions. The smectite-type clays are said to serve as supports for the reactive base and as a dispersing agent for improved reactivities. The swelling properties of smectite clays are said to be responsible for higher reactivity of the sorbents. The injection of the sorbents into these, particularly to the boiler (700°-1000° C.), along with coal was considered.

There remains a present need for technology that can improve the removal of mercury from combustion gases, and preferably to do so while being compatible or improving the removal of $SO_2$ and/or HCl in high percentages and in an economical manner in terms of material, equipment and disposal.

SUMMARY OF THE INVENTION

The present invention provides processes, apparatus, compositions and systems that will have a very positive effect on air quality by enabling reduction of mercury, while preferably enhancing remediation of $SO_x$ and/or HCl emissions at a very reasonable cost. The invention can be employed as a retrofit solution to existing plants and can be used in design of new plants.

In one aspect, the invention provides a process for reducing emissions of mercury from a combustor, comprising: identifying locations within a combustor for feeding a copper-based mercury remediation composition; determining the physical form and injection parameters for the copper-based mercury remediation composition; injecting the copper-based mercury remediation composition under conditions effective to react with the mercury; and collecting solids entrained in the gases, which solids include at least a portion of mercury reacted with the copper-based mercury remediation composition.

In embodiments, the copper-based mercury remediation composition is introduced at a temperature of less than 1000° F.

In embodiments a dolomite hydrate sorbent is also introduced as a slurry in droplets at a temperature of less than about 1000° F.

In another aspect, the invention provides an apparatus for reducing mercury in a gas stream, comprising: injection means positioned at locations on a passage for flue gases generated by the combustion of fuel, said injection means capable of feeding a mercury remediation composition at predetermined rates relative to a concentration of mercury in said flue gases; and particulate collection means to collect solids including mercury that has been reacted with the mercury remediation composition.

In another aspect, the invention provides a system for reducing mercury in a gas stream, comprising: computer modeling means for identifying locations within a combustor and its duct work for feeding a mercury remediation composition and determining the physical form and injection parameters for the mercury remediation composition; injection means positioned at locations on a passage for flue gases, said injection means capable of feeding mercury remediation composition at predetermined rates relative to a measured concentration of mercury in said passage; a particulate collection device to collect particles from said gas stream; and controller means for achieving the physical form and injection parameters as determined by said computer modeling means.

In another aspect, the invention provides a composition for reducing mercury in a gas stream, comprising: a copper-based mercury remediation composition and a manganese oxide sorbent and can also comprise an optional dolomite hydrate sorbent.

The invention provides several advantages compared with competitive processes, prominent among which are: remediating mercury emissions, treating flue gases to reduce $SO_x$; treating flue gases to reduce HCl; reducing sorbent material usage; enabling high mercury removal rates and oxidation of at least a part of remaining mercury; achieving important pollution control objectives with simple equipment that can be employed for retrofit.

Other preferred aspects and their advantages are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
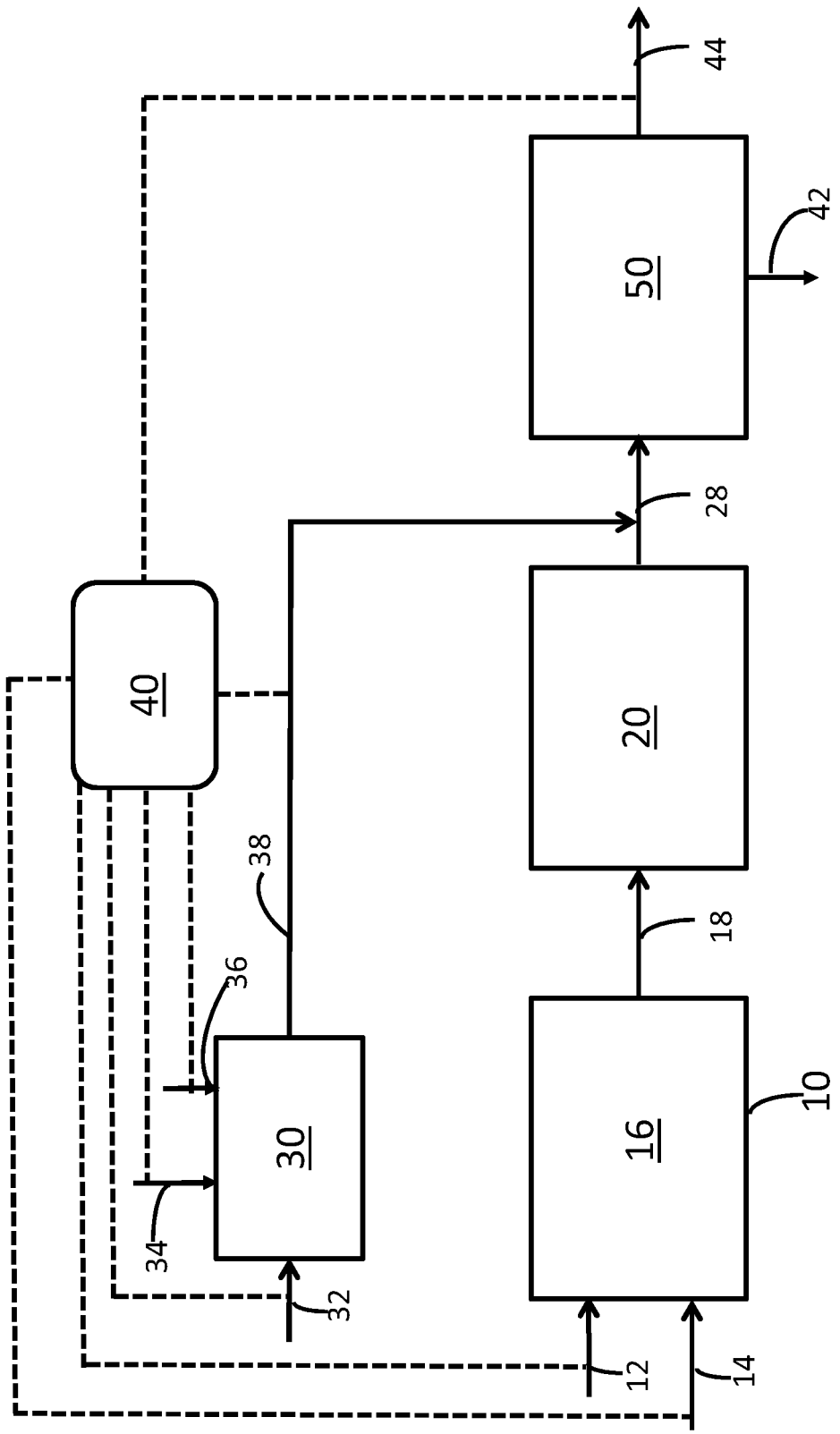
FIG. 1 is a flow diagram of one embodiment of the invention.

Reference will first be made to FIG. 1, which is a flow diagram of one embodiment of the invention. A combustor 10 can be of the type used for producing steam for electrical power generation, process steam, heating or incineration. Combustors of this type typically include various duct work and associated equipment that are not illustrated. It will be understood that other types of combustors can be employed to utilize the advantages of the invention. Unless otherwise indicated, all parts and percentages in this description are based on the weight of the materials at the particular point in processing or dry where that is indicated.

Coal is fed to the combustor 10 via line 12 and burned with air from line 14 in a combustion zone 16. It is an advantage of the invention that mercury-containing coals that are high in sulfur and/or chloride can be combusted and the mercury and resulting sulfur dioxides and/or hydrochloric acid can be reduced. It will be understood that the principles of the invention can be applied to other carbonaceous fuels and fuel mixtures (any other fuel of choice, typically a carbonaceous thermal fuel or refuse).

Air for combustion, supplied by line 14, is preferably preheated by gas-to-gas heat exchangers (not shown) which transfer heat from ductwork (not shown) at the exit end of the combustion equipment, e.g., downstream of heat exchange section 20, where useful thermal energy is recovered from the combustor. Hot combustion gases flow through the combustor as indicated by arrow 18 and flow through heat exchanger section 20, which transfers heat from the combustion gases to water or steam for the generation of steam or super-heated steam. Other heat exchangers, including an economizer (downstream and not shown) may also be provided according to the design of the particular boiler.

According to the invention, it has been determined that mercury emissions can be effectively reduced by the introduction of highly-effective copper-based mercury remediation compositions (MRC) alone or in combination with a sorbent and/or one or more optional flue gas treatment compositions. Among the sorbents are many of the sorbent materials identified in the prior art cited above, which are hereby incorporated by reference. Specific reference is made to dolomite hydrate, dolomite, calcium hydroxide, calcium carbonate, bonite, cement aggregate, magnesium oxide, magnesium dioxide, trona, mixed calcium and magnesium oxides, and mixtures of any of these in any commercial form effective for $SO_x$ reduction. When used with a sorbent, the copper-based MRCs provided by the invention will act to improve the $SO_2$ remediation effect and in this context are effective as sorbent doping agents in addition to being MRCs.

According to the invention, at least one copper-based MRC is employed as a water-soluble or water-dispersible composition of copper that is effective to release an active form, i.e., species, believed to be an oxide of copper, in situ when heated by the flue gases being treated. The copper-based MRC is typically employed (dry basis) at a rate of from about 1 to about 10 pounds per ton of fuel, with a narrower range being from about 2 to about 6 pounds per ton burned to produce the combustion flue gases.

The copper-based MRC can optionally be employed with a $SO_2$ sorbent, such as dolomite hydrate sorbent at a weight ratio (dry basis) of dolomite hydrate sorbent to copper-based MRC within the range of from about 100:1 to about 1:1. More preferred ratios will be within the range of from about 50:1 to about 5:2. Among the copper-based MRCs are those compositions described in U.S. Pat. Nos. 3,900,504 and 4,020,180 to Woerner, the disclosures of which are specifically incorporated herein by reference in their entireties.

In embodiments, the copper-based MRC can be water-soluble or water-dispersible copper compositions which are believed to form copper oxides when heated in situ by the flue gases being treated. Specifically referenced compositions are those described in U.S. Pat. No. 4,020,180 as comprising an aqueous cuprammonium lower carboxylate complex of copper lower carboxylate and ammonium lower carboxylate. Desirably in accord with U.S. Pat. No. 4,020,180, the complex will contain weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

In embodiments, copper-based MRCs according to the invention are highly soluble or dispersible in water and react with the hot combustion gases to result in compositions chemically different from when contacted with the combustion gases. Desirably, copper-based MRCs include copper compositions that have copper that can be released in an active form at the temperatures involved to form a reactive copper entity. While it is theorized that the copper is oxidized to copper oxide, CuO, applicants do not want to be bound by a particular theoretical reaction. It will be understood that the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding.

Among the copper-based MRCs of interest to the invention are compositions that comprise copper and an ammonia moiety. Among these are ammonium copper compositions, including those having one or more copper atoms with one or more ammonium moieties. Water solubility or dispersibility is important because introducing the MRCs with water has been shown to be a highly-effective manner of achieving the necessary distribution followed by dissociation. Chemical dispersants and agitation can be employed as necessary.

In embodiments of the invention, the copper-based MRCs will comprise a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these. From another perspective, the copper-based MRC can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is an integer equal to or greater than 1.

Closely related compositions and their hydrates as well other copper sources that exhibit similar efficacies in reacting with mercury can be employed. Copper compositions that contain no ammonium moiety, can be employed, but it is believed that these compositions will be facilitated in effectiveness by the presence of ammonia, such as a result of processing (e.g., for $NO_x$ reduction) or by supplementation as needed with ammonia or urea or other material effective to produce ammonia at the temperatures involved, as well as compounds equivalent in effect, e.g., amines and their salts, urea breakdown products, ammonium salts of organic and inorganic acids, ammonium carbamate, biuret, ammelide, ammeline, ammonium cyanate, ammonium carbonate, ammonium bicarbonate; ammonium carbamate; triuret, cyanuric acid; isocyanic acid; urea formaldehyde; melamine; tricyanourea and mixtures and equivalents of any number of these.

Among copper-based MRCs not containing an ammonium moiety are copper acetylacetonate (and hydrates thereof), copper citrate (and hydrates thereof, e.g., hemipentahydrate), copper formate (and hydrates thereof), copper acetate monohydrate, copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

The invention can include dolomite hydrate sorbent of fine particle size and high surface area as a highly-effective sorbent for $SO_x$ and/or HCl when employed with a copper-based MRC of the invention. The copper-based MRC is employed as a water-soluble or water-dispersible composition. The dolomite hydrate sorbent will typically be introduced with or separately, e.g., following the copper-based MRC at a temperature of under 1000° F., e.g., from about 200° to about 900° F., and dehydrate and be caused to shatter in situ by the flue gases being treated and comprised of a hot gas stream containing $SO_x$, into fine particles within the size range of from about 0.01 to about 0.2 microns and containing the copper oxide well dispersed therein.

Typically, when employed, the dolomite hydrate sorbent will be introduced based on modeling prior to introduction to achieve proper placement of injectors and adjustment of droplet size, momentum and concentration during introduction. The copper-based MRC alone and optional sorbent are dispersed over the cross section of the furnace section, duct or other apparatus where the flue gas is flowing. The dolomite hydrate can also be employed dry where this permits uniform distribution across the flow path of the flue gases being treated.

Dolomite hydrate sorbent, which has been found effective according to the invention for capturing $SO_x$ and/or HCl, is employed as dolomite hydrate and is preferably mixed with water to form a slurry with or without chemical stabilizers, to concentrations suitable for storage and handling, e.g., at least about 25%, and preferably at least about 40%, solids by weight. Preferred concentrations are within the range of from about 30 to about 50 weight %, e.g., from about 35 to about 45 weight %, based on the dry weight of the dolomite hydrate. The copper-based MRC can be blended with the dolomite hydrate sorbent at any practical point prior to introduction. In some cases it is introduced into a slurry tank or into injection equipment directly before introduction into the flue gas being treated.

Figure 2:
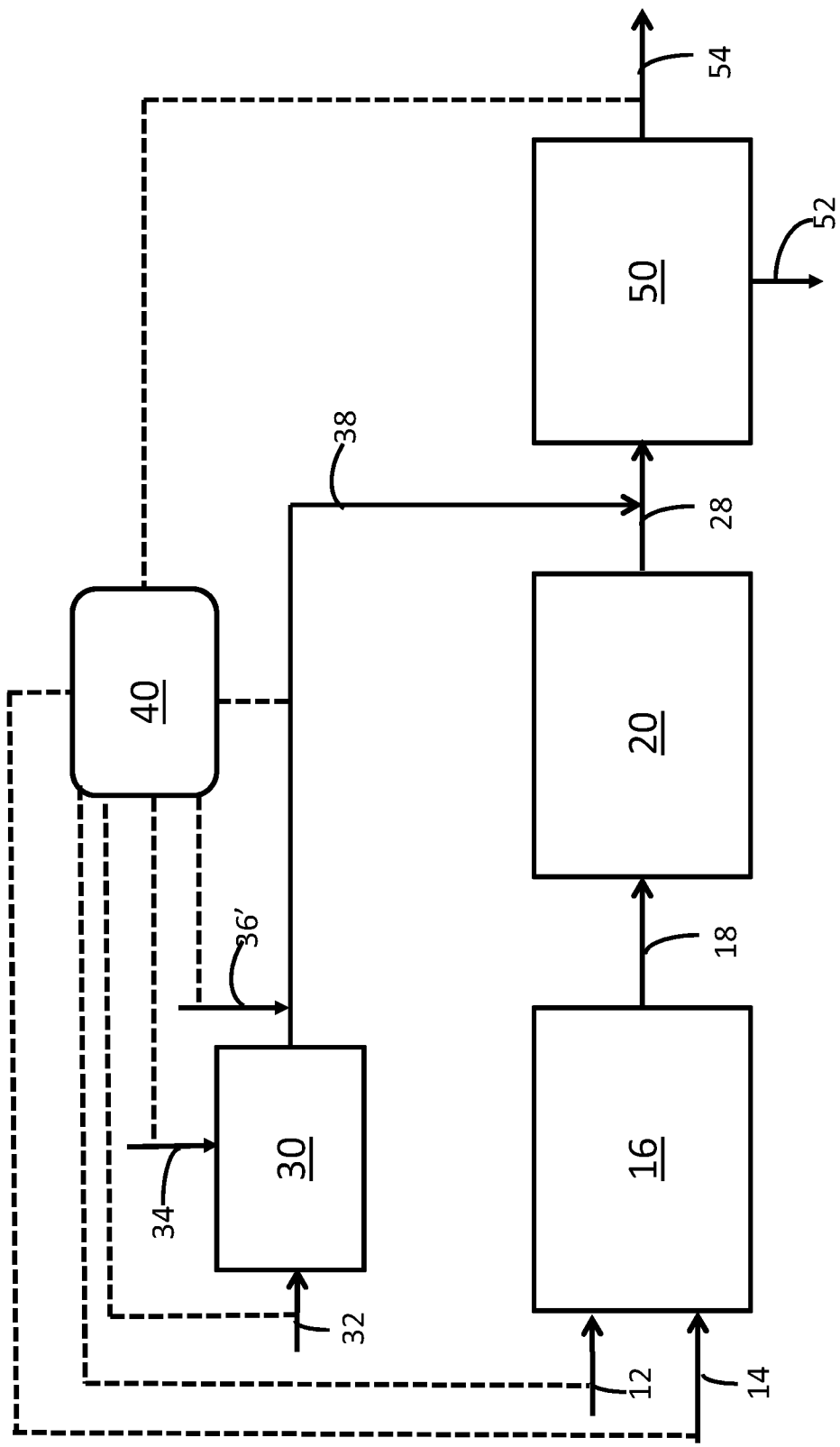
FIG. 2 is a flow diagram of another embodiment of the invention.

Reference is made to FIG. 1, which depicts a mixing stage 30 provided to hold the copper-based MRC alone or with a sorbent. A sorbent, e.g., dolomite hydrate sorbent lime slurry, preferably in a form having high surface area, e.g., above about 100 m²/gram (BET). For example, dolomite hydrate sorbent can be supplied via line 32, water can be supplied via line 34 and copper-based MRC can be supplied via line 36. The sorbent slurry is typically characterized as containing from about 25 to about 45% dolomite hydrate solids by weight in water. Suitable stabilizers can be used to avoid the need for constantly stirring the tanks, but stirring is preferably provided. The material can be further characterized as having a mass average particle size of from about 1 to about 5 microns (μ), e.g., nominally about 2 to 4 microns. An alternative scheme is shown in FIG. 2 wherein the copper-based MRC can be added through 36' to a slurry of dolomite hydrate sorbent in line 38 and mixed by suitable means in the line. In all cases, the relative amounts of the materials and water can be controlled by a suitable controller 40 or batching and feed can be adjusted manually. Dotted lines in the drawings schematically designate control lines for proper communication between the various controlled lines and valves and the controller 40.

Preferred conditions will call for introducing the copper-based MRC with or upstream of the optional sorbent. The flue gas will typically be at a temperature below about 1000° F. where treated, and will typically be within the range of from about 200° to about 900° F., preferably from about 350° F. to about 700° F. The copper-based MRC is distributed as a spray of fine droplets having a mean diameter of from about 10 to about 350 microns, e.g., from about 50 to about 200 microns, so that it will readily disperse alone or when added with sorbent, the sorbent will be present for contact with the gas. Upon contact with the flue gas, the sorbent slurry will dry and, it is believed, shatter to form ultra fine particles having a particle size of from about 0.01 to about 0.2 microns, e.g., about 0.02 to about 0.1 microns.

Preferred conditions will call for introducing the copper-based MRC using modeling techniques, such as computational fluid dynamics, which can be employed to initially determine the optimum locations (zones) to direct treatment chemicals within the boiler and/or ducts. Desirably, MRC and optional sorbent introduction will achieve essentially full coverage of the MRC and optional sorbent across a three-dimensional section of a passage for the gases to be treated. Preferably, a number of nozzles will be spaced within the zones to achieve essentially complete coverage, e.g., at least 70%, say at least 90%, coverage over a cross section of a zone at the temperature necessary for reaction. This section can have a depth in the direction of flow as necessary to assure complete coverage from the MRC and optional sorbent injectors used. In other words, the zone will preferably be of a depth in the direction of flow sufficient that each of the conical or like spray patterns from nozzles used to introduce the MRC and optional sorbent will overlap with at least one other spray pattern, thereby providing MRC and optional sorbent across essentially the entire cross section of the zone. This three-dimensional section for treatment can be referred to as a defined introduction zone, and the aqueous MRC and optional sorbent will be introduced into this zone under conditions effective for mercury and optional $SO_x$ and HCl emissions control. Following this zone (i.e., downstream of it) the combustion gases now having been treated with the MRC and optional sorbent are discharged following sufficient reaction time to reduce the mercury concentration in the gases.

When employed, the feed rate of the dolomite hydrate sorbent can be established at any rate calculated to effectively reduce the concentration of $SO_x$ in the flue gas and will depend on the amount of fuel and its sulfur content. For coal having about 0.2 to about 3% sulfur, a feed rate of about 50 pounds of sorbent per ton of fuel will be an adequate starting point, with the exact feed rate to be determined based on experimentation. Typical feed rates will be within the range of from about 10 to about 100 pounds of dolomite hydrate (dry) per ton of fuel, and preferred rates will be within the range of from about 20 to about 90 pounds, e.g., 30 to about 70 pounds, of dolomite hydrate per ton of fuel. The dolomite hydrate sorbent will typically be employed at a weight ratio of dolomite hydrate to $SO_2$ in the flue gases of from about 0.15:1 to about 1.4:1. Preferred rates will be within the range of from about 0.45:1 to about 1.2:1.

It is an advantage of the present invention that essentially complete coverage of the copper-based MRC and optional sorbent can be achieved in the combustion gases in an introduction zone at the temperature necessary for reaction. This section can have a depth in the direction of flow as necessary to assure essentially complete coverage from the copper-based MRC and sorbent injectors used and will depend on the spray pattern of the injectors and the velocity of the gases. In one variation of the invention, the copper-based MRC and dolomite hydrate sorbent are introduced through separate injectors. In another embodiment, the separate injectors can be in proximity or in tandem such that the spray patterns of each pair of injectors (and there may be many across the section) overlap to at least some extent. Desirably, the invention will achieve full effect by modeling, e.g., by mechanical modeling or computational fluid dynamics using computer and data input means to identify locations within a combustor for feeding a copper-based MRC alone or with sorbent and determine the physical form and injection parameters and injection locations for these chemicals, preferably in aqueous vehicle. Sorbent is shown to be introduced into line 28 in FIGS. 1, 2 and 3, via line 38 following heat exchange section 20 where the temperature will be lower than 1000° F., e.g., less than 900° F., e.g., within the range of from about 700° to about 200° F., is preferred.

The invention will employ suitable injection means, such as nozzles (not shown) of the internal mix or external mix type, which can be (but don't have to be) air atomized and are capable of feeding a copper-based MRC alone or with a dolomite hydrate sorbent at a predetermined rate relative to a measured concentration of $SO_x$ in said passage. Internal mix nozzles capable of extremely fine droplet production are preferred. The injection means should be further capable of introducing the MRC alone or with a dolomite hydrate sorbent in a predetermined physical form and with predetermined injection parameters for the MRC alone or with a dolomite hydrate sorbent including droplet size, momentum and concentration.

Preferably, air-assisted, atomizing nozzles are provided for introducing MRC and optional sorbent into combustion gases prior to or following heat exchanger section 20. The locations for the nozzles are preferably determined by computational fluid dynamics, by methodologies taught for example in U.S. Pat. No. 5,740,745 and U.S. Pat. No. 5,894,806, which are hereby incorporated by reference. The concentration and flow rates will be initially determined by modeling to assure that the proper amount of chemical is supplied to the correct location in the combustor in the correct physical form to achieve the desired results of reduced mercury and optionally $SO_2$ and/or HCl.

Following introduction of the copper-based MRC, alone or with a sorbent, the gases are passed through particulate recovery means 50, which can include one or more of fabric filters and electrostatic precipitators. Solids can be recovered via line 52, and flue gas can be exhausted via line 54.

Figure 3:
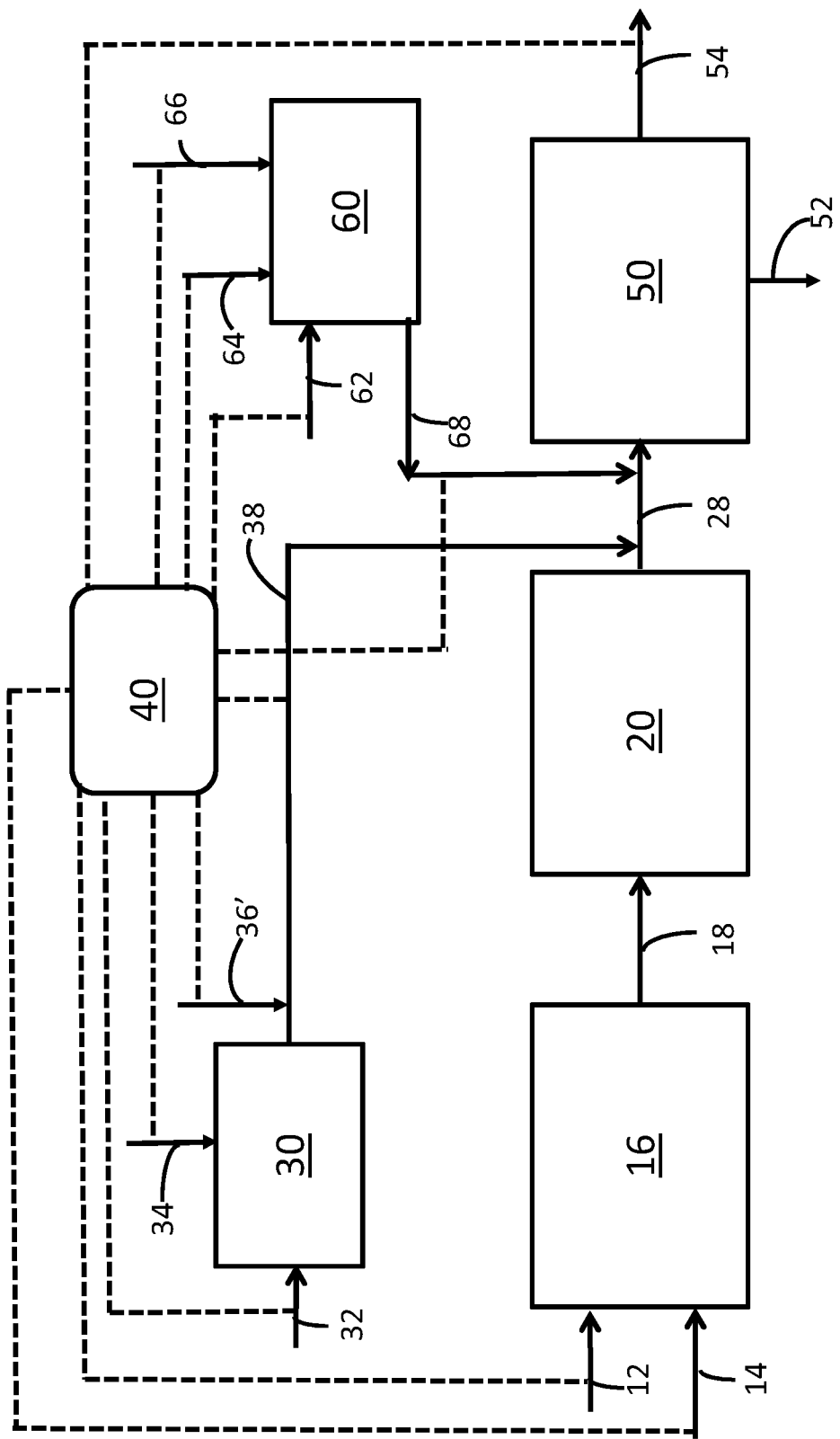
FIG. 3 is a flow diagram of another embodiment of the invention.

In the embodiment illustrated in the diagram of FIG. 3, an MRC and/or dolomite hydrate sorbent and/or a slurry of manganese oxide mercury control agent, such as a manganese oxide sorbent can be added alone or together based on experiences with particular fuels or fuel blend. The preferred manganese oxide mercury control agents can be any of those prepared in U.S. Pat. No. 6,579,507, to Pahlman, et al., and U.S. Patent Publication No. 2010/0059428, which are incorporated herein by reference as to the methods of preparing manganese dioxide sorbents. For example, Pahlman, et al., describes co-precipitated other metal oxides or foreign cations, represented by the formula $yMnO_x2H_2O$ where y is a foreign cation. They note that the formula $MnO_2$, symbolically represents all varieties of manganese dioxide including those with valence states ranging from +3 to +4, or $MnO_{1.5-20}$, coprecipitated oxides of manganese, oxides of manganese with foreign cations, and oxides of manganese including bound water. In this invention, the manganese oxide mercury control agent can be introduced as a slurry into a zone from preceding to following heat exchanger section 20. FIG. 3, depicts a mixing stage 60 provided to prepare manganese oxide slurry, preferably in a form having high surface area. The manganese oxide can be supplied via line 62, water can be supplied via line 64 and optional agent can be supplied via line 66. The manganese oxide slurry is typically characterized as containing from about 2% to about 40% hydrated manganese oxide solids by weight in water. Suitable stabilizers can be used to avoid the need for constantly stirring the tanks, but stirring is preferably provided.

The manganese oxide is slurried and fed to the flue gases via line 68 at a rate of from about 3 to about 20 pounds of manganese oxide per ton of fuel just prior to the preheater where the temperature is less than 1000° F., e.g., within the range of from about 300° to about 900° F.

In an alternative embodiment, the manganese oxide can be premixed with either or both of the dolomite hydrate sorbent and MRC prior to introduction and introduce at least the manganese oxide after the air preheater where the temperature is in the range of from about 300 to 450° F., e.g., about 350° F.

It is an advantage of the invention that the copper-based MRC is highly effective at oxidizing $Hg^0$ to $Hg^{+2}$, which enables enhanced mercury remediation by the addition of downstream technologies, such as mineral or activated carbon absorption prior to particulate recovery. This enhancing or trimming use of downstream technologies being in addition to collecting mercury following treatment with the copper-based MRC and collecting solids in a suitable particulate collection device 50. The processes of all of references cited above on mercury remediation are hereby incorporated by reference in their entireties as they relate to recovery of $Hg^{+2}$. The use of this technology followed by gas treatment in a wet scrubber such as any of those described above for addressing problem of sulfur oxides are hereby incorporated by reference in their entireties.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing emissions of mercury from a combustor, comprising:
    a. identifying locations within a combustor for feeding a copper-based mercury remediation composition;
    b. determining the physical form and injection parameters for the copper-based mercury remediation composition;
    c. injecting the copper-based mercury remediation composition under conditions effective to react with the mercury;
    d. introducing a manganese oxide slurry at a temperature of less than 1000° F.; and
    e. collecting solids entrained in the gases, which solids include at least a portion of mercury reacted with the copper-based mercury remediation composition.

2. A process according to claim 1, wherein the copper-based mercury remediation composition is introduced at a temperature of less than 1000° F.

3. A process according to claim 2, wherein a dolomite hydrate sorbent is introduced as a slurry in droplets having a mean diameter of from about 25 to about 350 microns at a temperature of less than about 1000° F.

4. A process according to claim 3, wherein the dolomite hydrate sorbent is introduced at a temperature within the range of from 300° to about 700° F.

5. A process according to claim 3, wherein the sorbent is introduced as droplets having a mean diameter of from about 25 to about 350 microns.

6. A process according to claim 3, wherein the sorbent is introduced at a feed rate within the range of from about 25 to about 100 pounds of dolomite hydrate per ton of fuel.

7. A process according to claim 3, wherein the dolomite hydrate is employed at a weight ratio of dolomite hydrate to weight of $SO_2$ in the flue gases of from about 0.15:1 to about 1.4:1.

8. A process according to claim 3, wherein the sorbent is injected as a slurry containing from about 25 to about 45% dolomite hydrate solids by weight in water.

9. A process according to claim 3, wherein the sorbent has a mass average particle size of from about 1 to about 5 microns (μ).

10. A process according to claim 3, wherein the dolomite hydrate sorbent is preferably mixed with water to form a slurry at a concentration of at least about 25% solids by weight.

11. A process according to claim 2, wherein a dolomite hydrate sorbent is introduced separately from the copper-based mercury remediation composition as a slurry in droplets having a mean diameter of from about 25 to about 350 microns at a temperature of less than about 1000° F.

12. A process according to claim 1, wherein the manganese oxide slurry is characterized as containing from about 1% to about 40% hydrated manganese oxide solids by weight in water.

13. A process according to claim 1, wherein the manganese oxide is slurried and fed to the flue gases a rate of from about 3 to about 20 pounds of manganese oxide per ton of fuel just prior to the preheater where the temperature is within the range of from about 300° to about 900° F.

14. A process according to claim 13, wherein the manganese oxide can be premixed with either or both of the dolomite hydrate sorbent and copper-based mercury remediation composition prior to introduction and introduce at least the manganese oxide after the air preheater where the temperature is in the range of from about 300 to 450° F.

15. A process according to claim 1, wherein the copper-based mercury remediation composition is employed with the dolomite hydrate sorbent at a weight ratio (dry basis) of dolomite hydrate to sorbent copper-based mercury remediation composition within the range of from about 100:1 to about 1:1.

16. A process according to claim 1, wherein the copper-based mercury remediation composition comprises a copper composition selected from the group consisting of copper ammonium acetate, copper diammonium diacetate, copper ammonium triacetate, copper triammonium acetate, copper tetra ammonium sulfate, copper gluconate and hydrates thereof, and mixtures of any of these.

17. A process according to claim 1, wherein the copper-based mercury remediation composition comprises an aqueous cuprammonium lower carboxylate complex of copper lower carboxylate and ammonium lower carboxylate.

18. A process according to claim 1, wherein the copper-based mercury remediation composition comprises an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

19. A process according to claim 1, wherein the copper-based mercury remediation composition comprises a member selected from the group consisting of: copper acetylacetonate and hydrates thereof, copper citrate and hydrates thereof, copper formate and hydrates thereof, copper acetate monohydrate, copper nitrate and hydrates thereof, copper 2,4-pentandionate and hydrates thereof, copper sulfate and hydrates thereof, copper gluconate and hydrates thereof, copper soaps of fatty acids, and mixtures of any of these.

20. A process according to claim 1, wherein the copper-based mercury remediation composition comprises copper diammonium diacetate.

21. A process according to claim 1, wherein the copper-based mercury remediation composition comprises a copper ammonium complex having an empirical formula of $C_2H_7CuNO_2$.

22. A process according to claim 1, wherein the copper-based mercury remediation composition is introduced by injection means comprising a plurality of nozzles within an introduction zone, and the nozzles are positioned to achieve at least 90% coverage within the introduction zone.

23. A Process according to claim 1, wherein the copper-based mercury remediation composition can be a member selected from the group consisting of compositions defined by the formula $Cu(NH_3)_x(\text{lower carboxylate})_y$, wherein the lower carboxylate is selected from the group consisting of formate, acetate and propionate, x is an integer from 0 to 4, y is an integer from 0 to 2, and x+y is equal to or greater than 1.

24. An apparatus for reducing mercury in a gas stream, comprising:
   a. injection means positioned at locations on a passage for flue gases generated by the combustion of fuel, said injection means capable of feeding a mercury remediation composition with water at predetermined rates relative to a concentration of mercury in said flue gases; and
   b. particulate collection means to collect solids including mercury that has been contacted with the mercury remediation composition.

25. A system for reducing mercury in a gas stream, comprising:
   a. computer modeling means for identifying locations within a combustor and its duct work for feeding a mercury remediation composition with water and determining the physical form and injection parameters for the mercury remediation composition;
   b. injection means positioned at locations on a passage for flue gases, said injection means capable of feeding mercury remediation composition with water at predetermined rates relative to a measured concentration of mercury in said passage;
   c. a particulate collection device to collect particles from said gas stream; and
   d. controller means for achieving the physical form and injection parameters as determined by said computer modeling means.

26. A composition for reducing mercury in a gas stream, comprising: water, a copper-based mercury remediation composition and a manganese oxide sorbent.

27. A composition according to claim 26 which also comprises dolomite hydrate sorbent.

28. A process for reducing emissions of mercury from a combustor, comprising:
   a. identifying locations within a flue gas for feeding a copper-based mercury remediation composition with water, wherein the copper-based mercury remediation composition comprises a copper composition selected from the group consisting of copper ammonium acetate, copper diammonium diacetate, copper ammonium triacetate, copper triammonium acetate, copper tetra ammonium sulfate, copper gluconate, and mixtures of any of these;
   b. determining the physical form and injection parameters for the copper-based mercury remediation composition with water;
   c. injecting the copper-based mercury remediation composition with water into said flue gas under conditions effective to react with the mercury; and
   d. collecting solids entrained in the gases, which solids include at least a portion of mercury reacted with the copper-based mercury remediation composition.

29. A process for reducing emissions of mercury from a combustor, comprising:

a. identifying locations within a flue gas for feeding a copper-based mercury remediation composition with water, wherein the copper-based mercury remediation composition can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1;

b. determining the physical form and injection parameters for the copper-based mercury remediation composition with water;

c. injecting the copper-based mercury remediation composition with water into said flue gas under conditions effective to react with the mercury; and d. collecting solids entrained in the gases, which solids include at least a portion of mercury reacted with the copper-based mercury remediation composition.

30. A process for reducing emissions of mercury from a combustor, comprising:

a. Introducing a the copper-based mercury remediation composition with water into a flue gas where the flue gas is at a temperature of less than 1000° F.;

b. introducing a dolomite hydrate sorbent into said flue gas as a slurry in droplets having a mean diameter of from about 25 to about 350 microns where the flue gas is at a temperature of less than about 1000° F.;

c. collecting solids entrained in the gases, which solids include at least a portion of mercury reacted with the copper-based mercury remediation composition.

31. A process for reducing emissions of mercury from a combustor, comprising:

a. injecting the copper-based mercury remediation composition with water into a flue gas where the flue gas is at a temperature of less than 1000° F.;

b. introducing a dolomite hydrate sorbent into said flue gas the sorbent at a feed rates within the range of from about 25 to about 100 pounds of dolomite hydrate per ton of fuel wherein the dolomite hydrate is in the form of a slurry having droplets with a mean diameter of from about 25 to about 350 microns where the flue gas is at a temperature of less than about 1000° F.; and c. collecting solids entrained in the gases, which solids include at least a portion of mercury reacted with the copper-based mercury remediation composition.

32. A process for reducing emissions of mercury from a combustor, comprising:

a. injecting a copper-based mercury remediation composition with water into a flue gas where the flue gas is at a temperature of less than 1000° F.;

b. introducing a dolomite hydrate sorbent into said flue gas at a weight ratio of dolomite hydrate to weight of $SO_2$ in the flue gases of from about 0.15:1 to about 1.4:1 and the dolomite hydrate is introduced in the form of a slurry having droplets with a mean diameter of from about 25 to about 350 microns where the flue gas is at a temperature of less than about 1000° F.; and c. collecting solids entrained in the gases, which solids include at least a portion of mercury reacted with the copper-based mercury remediation composition.

33. A process for reducing emissions of mercury from a combustor, comprising:

a. injecting a copper-based mercury remediation composition with water into a flue gas where the flue gas is at a temperature of less than 1000° F.;

b. introducing a dolomite hydrate sorbent into said flue gas wherein the copper-based mercury remediation composition is employed with the dolomite hydrate sorbent at a weight ratio on a dry basis of dolomite hydrate to copper-based mercury remediation composition is within the range of from about 100:1 to about 1:1 and the dolomite hydrate is introduced in the form of a slurry having droplets with a mean diameter of from about 25 to about 350 microns where the flue gas is at a temperature of less than about 1000° F.; and c. collecting solids entrained in the gases, which solids include at least a portion of mercury reacted with the copper-based mercury remediation composition.

34. A process for reducing emissions of mercury from a combustor, comprising:

a. injecting a copper-based mercury remediation composition with water into a flue gas where the flue gas is at a temperature of less than 1000° F., wherein the copper-based mercury remediation composition comprises a material selected from the group consisting of i. copper ammonium acetate, copper diammonium diacetate, copper ammonium triacetate, copper triammonium acetate, copper tetra ammonium sulfate, copper gluconate and hydrates thereof, and mixtures of any of these;

ii. a composition defined by the formula $Cu(NH_3)_x$ (lower carboxylate)$_y$, wherein the lower carboxylate is selected from the group consisting of formate, acetate and propionate, x is an integer from 0 to 4, y is an integer from 0 to 2, and x+y is equal to or greater than 1;

iii. an aqueous cuprammonium lower carboxylate complex of copper lower carboxylate and ammonium lower carboxylate;

iv. an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4;

v. copper acetylacetonate and hydrates thereof, copper citrate and hydrates thereof, copper formate and hydrates thereof, copper acetate monohydrate, copper nitrate and hydrates thereof, copper 2,4-pentandionate and hydrates thereof, copper sulfate and hydrates thereof, copper gluconate and hydrates thereof, copper soaps of fatty acids, and mixtures of any of these;

vi. a copper ammonium complex having an empirical formula of $C_2H_7CuNO_2$, and b. collecting solids entrained in the gases, which solids include at least a portion of mercury reacted with the copper-based mercury remediation composition.

* * * * *